US007707292B2

(12) United States Patent
Henderson et al.

(10) Patent No.: US 7,707,292 B2
(45) Date of Patent: Apr. 27, 2010

(54) METHOD FOR SIGNING INTO A MOBILE DEVICE OVER A NETWORK

(75) Inventors: Irvin Henderson, Palo Alto, CA (US); Naveen Dasa Sanjeeva, Milpitas, CA (US); Thyagarajapuram Swaminathan Ramakrishnan, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1139 days.

(21) Appl. No.: 11/084,769

(22) Filed: Mar. 18, 2005

(65) Prior Publication Data

US 2006/0230112 A1    Oct. 12, 2006

(51) Int. Cl.
*G06F 15/16* (2006.01)
(52) U.S. Cl. .................... 709/227; 709/206; 709/228
(58) Field of Classification Search ............... 709/227, 709/230, 224, 206, 228
See application file for complete search history.

(56) References Cited

U.S. PATENT DOCUMENTS

| 5,581,753 | A  | * | 12/1996 | Terry et al. ............... 707/201 |
| 5,758,088 | A  |   | 5/1998  | Bezaire et al. |
| 6,021,433 | A  |   | 2/2000  | Payne et al. |
| 6,167,426 | A  |   | 12/2000 | Payne et al. |
| 6,704,031 | B1 | * | 3/2004  | Kimball et al. ............ 715/745 |
| 6,735,614 | B1 |   | 5/2004  | Payne et al. |
| 6,754,492 | B1 |   | 6/2004  | Stammers et al. |
| 6,779,025 | B1 | * | 8/2004  | Wolfe et al. ............... 709/219 |
| 6,853,634 | B1 | * | 2/2005  | Davies et al. ............... 370/349 |
| 6,865,680 | B1 |   | 3/2005  | Wu et al. |
| 6,876,728 | B2 | * | 4/2005  | Kredo et al. ............ 379/88.17 |
| 6,912,564 | B1 | * | 6/2005  | Appelman et al. .......... 709/204 |
| 7,277,947 | B1 | * | 10/2007 | Van De Sluis et al. ...... 709/227 |
| 7,287,057 | B2 | * | 10/2007 | Lagarde et al. ............. 709/206 |
| 7,305,350 | B1 | * | 12/2007 | Bruecken ....................... 705/1 |
| 7,315,747 | B2 | * | 1/2008  | Klassen et al. .............. 455/466 |
| 7,359,938 | B1 | * | 4/2008  | Davies et al. ............... 709/204 |
| 7,366,779 | B1 | * | 4/2008  | Crawford .................... 709/227 |
| 7,380,007 | B1 | * | 5/2008  | Bu et al. ..................... 709/227 |
| 7,392,306 | B1 | * | 6/2008  | Donner et al. .............. 709/224 |
| 7,443,839 | B2 | * | 10/2008 | Bouthemy et al. .......... 370/352 |
| 7,487,248 | B2 | * | 2/2009  | Moran et al. ................ 709/227 |
| 7,526,572 | B2 | * | 4/2009  | Omar et al. ................. 709/246 |
| 7,543,034 | B2 | * | 6/2009  | Deshpande ................. 709/207 |
| 2002/0026517 | A1 | * | 2/2002 | Watson, Jr. ................. 709/228 |
| 2002/0065912 | A1 | * | 5/2002 | Catchpole et al. ........... 709/224 |
| 2002/0129027 | A1 | * | 9/2002 | Cameron et al. .............. 707/10 |

(Continued)

*Primary Examiner*—Joseph Thomas
*Assistant Examiner*—Tae K Kim
(74) *Attorney, Agent, or Firm*—Darby & Darby P.C.; Jamie L. Wiegand (57) ABSTRACT

A system, apparatus, and method are directed to managing automatic sign in to an Instant Messaging (IM) session on mobile device from another computing device, such as a personal computer (PC), over a network. The end-user of the PC may provide an account identifier, password, and the like, and in response, receive a cookie, that may further include the account identifier, encoded string, and the like. The end-user may then request initiation of the IM session using a toolbar selection, a script, applet, form, web page selection, and the like. As part of the request, the cookie may be provided to the server. If the request is authenticated based, in part, on the cookie information, the server uses the account identifier to locate an associated a mobile device identifier. The mobile device identifier is employed to log the end-user automatically into the mobile device.

20 Claims, 3 Drawing Sheets

U.S. PATENT DOCUMENTS

| | | | |
|---|---|---|---|
| 2002/0173308 A1* | 11/2002 | Dorenbosch et al. | 455/435 |
| 2003/0002633 A1* | 1/2003 | Kredo et al. | 379/88.08 |
| 2003/0014477 A1* | 1/2003 | Oppenheimer et al. | 709/203 |
| 2003/0018726 A1* | 1/2003 | Low et al. | 709/206 |
| 2003/0065721 A1* | 4/2003 | Roskind | 709/204 |
| 2003/0159068 A1* | 8/2003 | Halpin et al. | 713/201 |
| 2003/0163563 A1* | 8/2003 | Bean | 709/224 |
| 2003/0167318 A1* | 9/2003 | Robbin et al. | 709/221 |
| 2003/0187991 A1* | 10/2003 | Lin et al. | 709/227 |
| 2004/0068567 A1* | 4/2004 | Moran et al. | 709/227 |
| 2004/0158609 A1* | 8/2004 | Daniell et al. | 709/206 |
| 2004/0172456 A1* | 9/2004 | Green et al. | 709/207 |
| 2005/0025155 A1* | 2/2005 | Jerbi et al. | 370/395.2 |
| 2005/0188095 A1* | 8/2005 | Gardiner et al. | 709/230 |
| 2005/0289341 A1* | 12/2005 | Ritola et al. | 713/168 |
| 2006/0031292 A1* | 2/2006 | Deshpande | 709/204 |
| 2006/0043164 A1* | 3/2006 | Dowling et al. | 235/375 |
| 2007/0054627 A1* | 3/2007 | Wormald | 455/70 |

\* cited by examiner

METHOD FOR SIGNING INTO A MOBILE DEVICE OVER A NETWORK

FIELD OF THE INVENTION

The invention relates generally to remote computing connections, and more particularly but not exclusively to managing automatic signing into a remote device from another computing device over a network.

BACKGROUND OF THE INVENTION

The use of mobile technologies is steadily on the increase, for both business and personal uses. Mobile phones are a common site today and many people own personal information management (PIM) devices, palmtop computers, and so forth, to manage their schedules, contacts, and to stay connected with friends, family, and work. Employees on the move often appreciate the value of staying connected with their business through their mobile devices.

With such a variety of mobile devices, one can receive email messages, Instant Messaging (IM) messages, and Short Message Service (SMS) text messages, in addition to regular voice calls. With the growing proliferation of such mobile devices, it is becoming ever more important to ensure that employees, friends, and family are able to remain seamlessly connected to each other as they transition from a home or office based stationary computing device to a mobile situation. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Briefly stated, the invention is directed towards a system, apparatus, and method for managing automatic sign onto a mobile device from another computing device, such as a personal computer (PC), over a network. The invention enables an end-user on the PC to select an option to sign into the mobile device. The option may, for example, include a button on a toolbar, a script, menu, an applet, script, form, a web page selection, and the like. In one embodiment, the end-user employs clicks on a link, button, or the like, using a client other than an IM client application on the PC. For example, the end-user may employ a web browser. In another embodiment, the end-user may select an option or click on a button on a pre-defined toolbar associated with the web browser. The pre-defined toolbar may, for example, be associated with a server configured to manage end-user accounts.

In another embodiment, the end-user currently is signed into an Instant Messenger (IM) session on the PC. However, the invention is not constrained to this configuration, and the end-user may merely currently be signed into a server configured to manage an end-user account. The PC application, such as a browser, is configured to provide information, such as an end-user account identifier, an authorization code, IM identifier, a session identifier, cookies, and the like, to the server. If the end-user is authenticated based, in part, on the provided information, the server employs the information to locate a mobile device identifier associated with the provided end-user account identifier. The located mobile device identifier is then used to log the end-user automatically into the identified mobile device. A message, such as a text message, may also be sent to the mobile device to acknowledge the sign on action. Such message may be sent to the mobile device employing, for example, a Short Message Service (SMS) message. In one embodiment, however, the invention may send a notification to the mobile device to force the mobile device to sign into the IM session. In another embodiment, if the end-user is currently logged into an IM session on the PC, the PC IM session will be automatically terminated on the PC and transferred to the mobile device.

Illustrative Operating Environment

Figure 1:
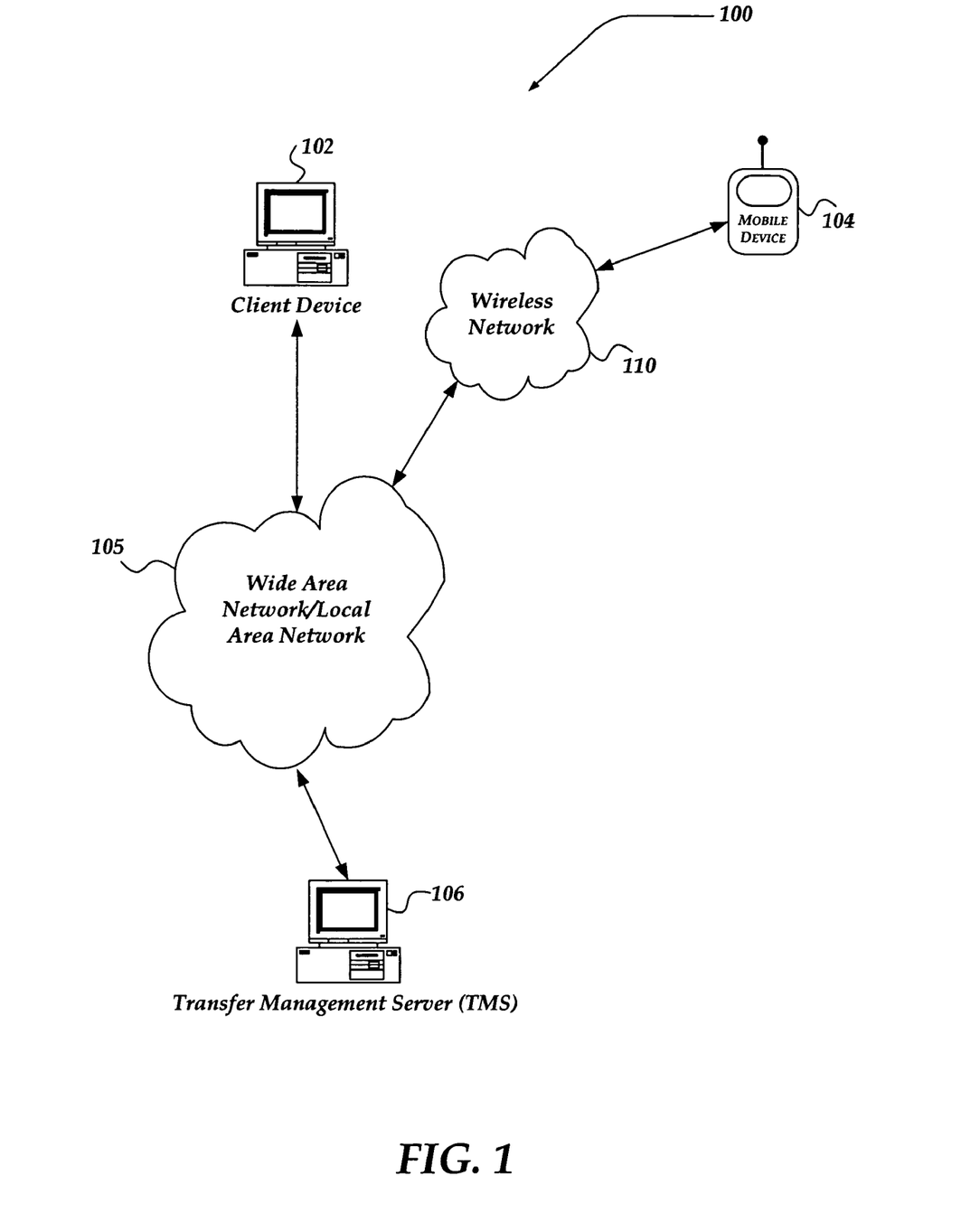
FIG. 1 shows a functional block diagram illustrating one embodiment of an environment for practicing the invention.

FIG. 1 shows components of an exemplary environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs") 105, wireless network 110, Transfer Management Server (TMS) 106, client device 102, and mobile device 104. Client device 102 is in communication with mobile device 104 through TMS 106, network 105, and wireless network 110.

Generally, client device 102 may include virtually any computing device capable of receiving and sending a message over a network, such as network 105, wireless network 110, and the like, to and from another computing device, such as TMS 106, mobile device 104, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client device 102 also may be any computing device that is capable of connecting using a wired or wireless communication medium such as a PDA, POCKET PC, laptop computer, wearable computer, and any other device that is equipped to communicate over a wired and/or wireless communication medium.

Client device 102 may include a browser application that is configured to receive and to send web pages, web-based messages, and the like. The browser application may be configured to receive and display graphics, text, multimedia, and the like, employing virtually any web based language, including Standard Generalized Markup Language (SMGL), HyperText Markup Language (HTML), eXtensible Markup Language (XML), and so forth. Generally, the browser application is configured to receive various information, including a cookie, crumb, script, applet, and the like, from another computing device, such as TMS 106.

Client device 102 may further include a client application that enables it to perform a variety of other actions, including, communicating a message, such as through a Short Message Service (SMS), Multimedia Message Service (MMS), instant messaging (IM), internet relay chat (IRC), Mardam-Bey's IRC (mIRC), Jabber, and the like, between itself and another computing device. The browser application, and/or another application, such as the client application, a plug-in application, and the like, may enable client device 102 to communicate content to another computing device.

Client device 102 also may include at least one client application that is configured to receive content from another computing device. The client application may include a capability to provide and receive textual content, graphical content, audio content, and the like. The client application may further provide information that identifies itself, including a type, capability, name, identifier, and the like. The information may also indicate a content format that mobile device 104 is enabled to employ. Such information may be provided in a message, or the like, sent to TMS 106, and the like.

Mobile device 104 represents one embodiment of a client device that is configured to be portable. Thus, mobile device 104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 104 typically ranges widely in terms of capabilities and features. For example, a cell phone may have a numeric keypad and a few lines of monochrome LCD display on which only text may be displayed. In another example, a web-enabled remote device may have a touch sensitive screen, a stylus, and several lines of color LCD display in which both text and graphics may be displayed. Moreover, the web-enabled remote device may include a browser application enabled to receive and to send wireless application protocol messages (WAP), and the like. In one embodiment, the browser application is enabled to employ a Handheld Device Markup Language (HDML), Wireless Markup Language (WML), WMLScript, JavaScript, XML, and the like, to display and send a message.

Mobile device 104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile device 104 may uniquely identify itself through any of a variety of mechanisms, including a phone number, Mobile Identification Number (MIN), an electronic serial number (ESN), or other mobile device identifier. The information may also indicate a content format that mobile device 104 is enabled to employ. Such information may be provided in a message, or the like, sent to TMS 106, and the like.

Mobile device 104 may be configured to communicate a message, such as through a SMS, MMS, IM, IRC, mIRC, Jabber, and the like, between another computing device, such as TMS 106, client device 102, and the like. However, the present invention is not limited to these message protocols, and virtually any other message protocol may be employed.

Client device 102 and mobile device 104 may be further configured to enable a user to participate in IM sessions, and the like, and to transfer an existing IM session, and the like, between devices. As such, client device 102 and mobile device 104 may include a client application that is configured to manage various actions on behalf of the client device. For example, the client application may enable a user to interact with the browser application, email application, IM applications, SMS application, and the like, to manage signing into and/or transferring of an IM session between the devices. For example, an end-user of client device 102 may employ the client application, in part, to employ a tool bar selection button, script, applet, form, browser web page, and the like, to indicate intent to automatically sign into mobile device 104 with an IM session. In one embodiment, the end-user on client device 102 is currently logged into an IM session.

Client device 102 may further be configured to include a client application that enables the end-user to log into an end-user account that may be managed, at least in part, by TMS 106. Such end-user account, for example, may be configured to enable the end-user to receive emails, send/receive IM messages, SMS messages, access selected web pages, and the like. Moreover, the end-user account may be further configured to enable the end-user authorization to automatically start an IM session on a mobile device.

Wireless network 110 is configured to couple mobile device 104 and its components with WAN/LAN 102. Wireless network 110 may include any of a variety of wireless sub-networks that may further overlay stand-alone ad-hoc networks, and the like, to provide an infrastructure-oriented connection for mobile device 104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile device 104 and another computing device, network, and the like.

Network 105 is configured to couple TMS 106 and its components with other computing devices, including, client device 102, TMS 106, and through wireless network 110 to mobile device 104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between TMS 106 and another computing device.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of TMS 106 is described in more detail below in conjunction with FIG. 2. Briefly, however, TMS 106 may include any computing device capable of connecting to network 105 to enable an end-user to automatically manage a sign into mobile device 104 from client device 102. TMS 106 may then enable the end-user to be logged off of an IM session on client device 102 and logged into an IM session on mobile device 104, such that the two sessions appear to be a seamless single IM session. TMS 106 may also start an IM session on mobile device 103 while no active IM session is currently on client device 102. In one embodiment, TMS 106 provides a message to mobile device 104 indicating that the IM session is transferred. The message may be provided using any of a variety of mechanisms, including a pre-determined voice message, an SMS text message, and the like.

TMS 106 may be further configured to provide and manage end-user accounts that are configured to provide such services to the end-user as, for example, email, access to games, selected web pages, chat sessions, IM sessions, SMS sessions, social networks, and the like. However, the present invention is not constrained by such examples, and more or less services may be provided, without departing from the scope or spirit of the invention.

Devices that may operate as TMS 106 include personal computers desktop computers, multiprocessor systems, microprocessor-based or programmable consumer electronics, network PCs, servers, and the like.

Although FIG. 1 illustrates TMS 106 as a single computing device, the invention is not so limited. For example, one or more functions of TMS 106 may be distributed across one or more distinct computing devices. For example, IM sessions may be managed by a different computing device than are web services. Similarly, SMS sessions, session transfers, authentication, and the like, may reside on different computing devices, without departing from the scope or spirit of the present invention.

Illustrative Server Environment

Figure 2:
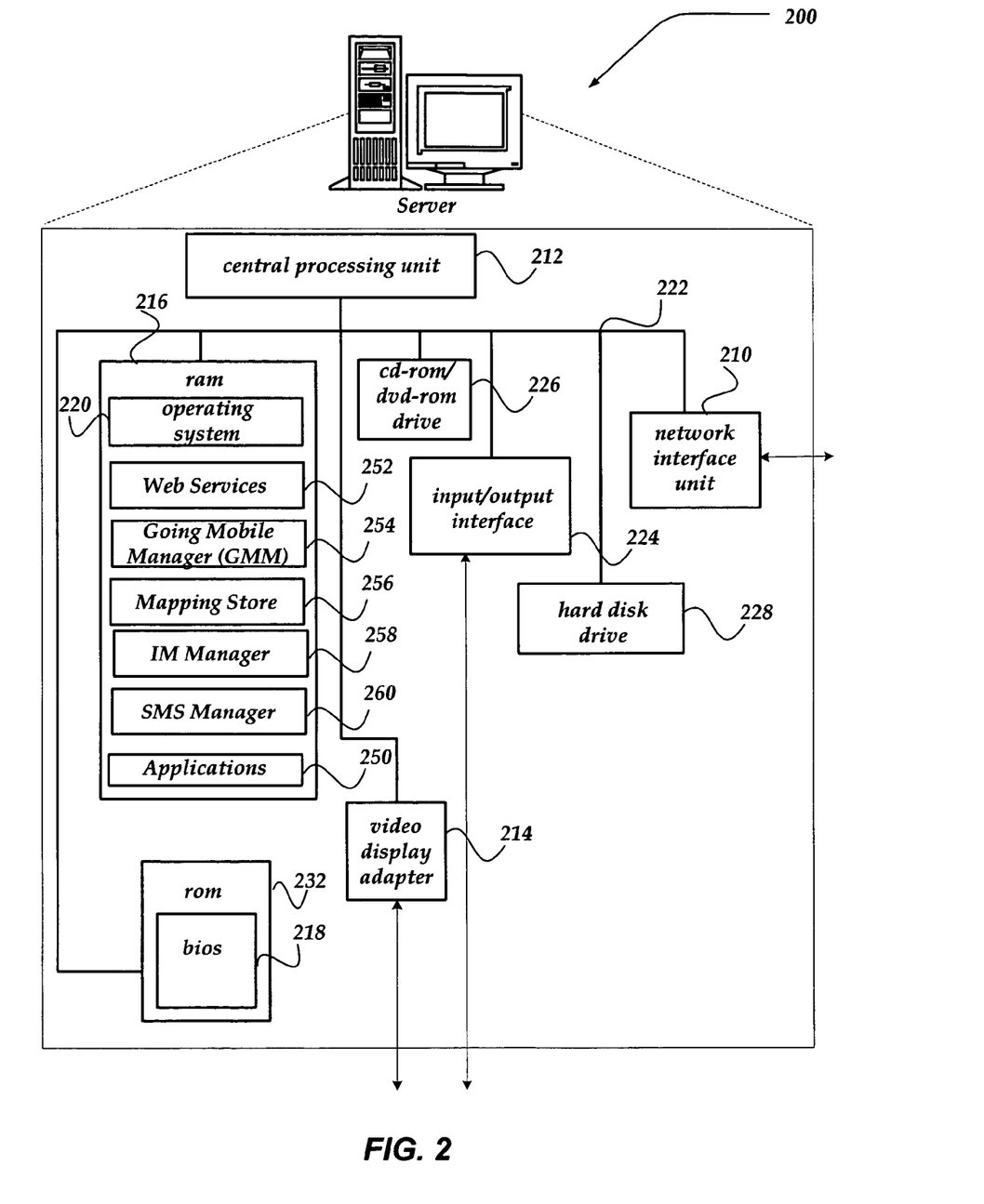
FIG. 2 shows one embodiment of a server device for use in managing an automatic sign into mobile device.

FIG. 2 shows one embodiment of a server device, according to one embodiment of the invention. Server device 200 may include many more components than those shown. The components shown, however, are sufficient to disclose an illustrative embodiment for practicing the invention.

Server device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 102. As illustrated in FIG. 2, server device 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

Server device 200 also includes input/output interface 224 for communicating with external devices, such as a mouse, keyboard, scanner, or other input devices not shown in FIG. 2. Likewise, server device 200 may further include additional mass storage facilities such as CD-ROM/DVD-ROM drive 226 and hard disk drive 228. Hard disk drive 228 is utilized by server 102 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, transcoders, database programs, word processing programs, spreadsheet programs, and so forth. Mass storage may further include applications such as web services 252, Going Mobile Manager (GMM) 254, mapping store 256, IM manager 258, and SMS manager 260.

Web services 252 are configured to manage requests from a client device's browser application and deliver web-based content in response. As such, web services 252 may include such applications as Apache, Internet Information Server (IIS), Netscape, National Center for Supercomputing Applications (NCSA), and the like. In one embodiment, web services 252 may communicate with the client's browser application employing HTTP. However, web services may also execute server-side scripts (CGI scripts, JSPs, ASPs, and so forth) that provide functions such as database searching, e-commerce, session initiation, and the like. In one embodiment, web services 252 interacts with GMM 254 to enable an end-user of a computing device, such as client device 102 of FIG. 1, to automatically sign onto a mobile device with an IM session.

For example, web services 252 may be configured to enable an end-user of a computing device to log into an end-user account, receive web pages, as well as cookies, crumbs, scripts, applets, and the like. In one embodiment, web services 252 are configured to provide a cookie, or other form of information, including a data structure, text file, and the like, to the end-user computing device, if the end-user properly logs into their end-user account. Such a cookie, or other form of information, may include any of a variety of end-user related information, useable to authenticate the end-user, including an encrypted end-user account identifier, an authorization code, a random number, an encrypted password, and the like. However, the invention is not limited to sending the cookie, or other information, when the end-user logs into their end-user account, and virtually any other criteria may be employed, including requesting the end-user provide an end-user account identifier and password, without logging into the end-user account.

Web services 252 may also be configured to generate and to send an encoded string, sometimes called a crumb, to the other computing device to indicate that the end-user has accessed a web page, script, applet, form, and the like, that is configured to enable the initiation of an IM session on a mobile device. The encoded string may represent any of a variety of authorization information, including an encrypted authorization code, a random number, and the like. In one embodiment, the crumb may be provided to the other computing device, such as an intermediate service, as part of a URL link. Moreover, in one embodiment, if the end-user requests automatic sign in to an IM session, employing a toolbar, or the like, a crumb might not be provided. Thus, the crumb may be employed to ensure that a third party site, unauthorized end-user, or the like, does not attempt to force a potentially disruptive request to GMM 254, Web services 252, and the like.

IM manager 258 includes virtually any server application configured to manage an instant message session with another computing device. Similarly, SMS manager 260 includes virtually any server application configured to manage an SMS message session with another computing device.

Mapping store 256 includes virtually any storage mechanism, including a file, folder, database, script, spreadsheet, and the like, for storing and managing a mapping relationship between an end-user account identifier and a mobile device identifier. The mapping relationship may be determined by a prior action that registers the mobile device. For example, in one embodiment, the end-user, administrator, or the like, may employ a browser to provide information, including the mobile device identifier and an end-user account identifier. In another embodiment, the end-user may employ an SMS message, and the like, through the mobile device to automatically register the mobile device. Mapping store 256 is not limited to just an end-user account identifier and a mobile device identifier. For example, mapping store 256 may also include information about the type, capability, and the like, of the mobile device. GMM 254 is configured to detect a request to automatically sign an end-user into an IM session on a mobile device, from another computing device. GMM 254 may do so, based, at least in part when it receives a request from an end-user. In one embodiment, the end-user employs a non-IM client application on a computing device, such as client device 102, mobile device 104, and the like to initiate the request.

GMM 254 may be further configured to receive the cookie, and optionally, the crumb from web services 254 as part of the request to automatically sign the end-user into an IM session on the mobile device. If GMM 254 determines that the end-user is authentic, based in part on the cookie, or other information, and optionally the crumb information, GNM 254 may employ the information, such as an end-user account identifier, to search mapping store 256 for an associated mobile device identifier. In one embodiment, GMM 254 may forward the found mobile device identifier to IM manager 258 in a request to sign in the end-user into an IM session on the identified mobile device. In another embodiment, GMM 254 may provide a text message to the identified mobile device using SMS manager 260, indicating that an IM session is established. In another embodiment, GMM 254 may send the identified mobile device a notification, message, and the like, that is configured to force a client application within the mobile device to sign into the IM session.

GMM 254 may also request that the end-user be logged off of any IM session on the other computing device. GMM 254 may employ a process such as described below in conjunction with FIG. 3 to perform such actions.

Generalized Operation

Figure 3:
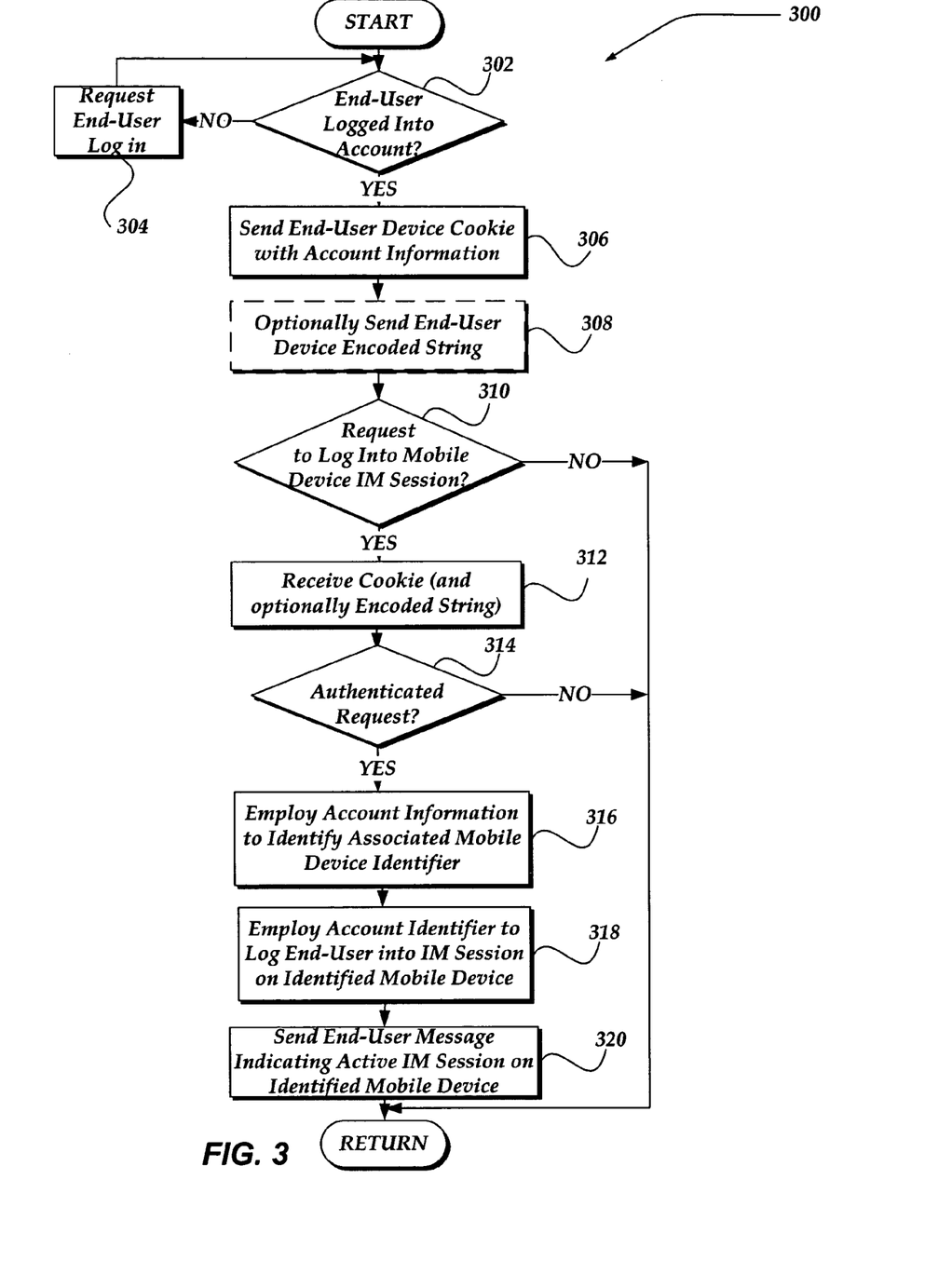
FIG. 3 illustrates a logical flow diagram generally showing one embodiment of a process for managing automatic signing into a mobile device over a network, in accordance with the present invention.

The operation of certain aspects of the invention will now be described with respect to FIG. 3. FIG. 3 illustrates a logical flow diagram generally showing one embodiment of a process for managing an automatic sign into a mobile device over a network. Process 300 of FIG. 3 may be employed, for example, by TMS 106 of FIG. 1.

As shown in FIG. 3, process 300 begins, after a start block, at decision block 302, where a determination is made whether an end-user of a computing device is logged into an end-user account on a server, such as an end-user account server, and the like. The end-user may, for example, be browsing web pages, requesting, and/or receiving information from the server, without being logged into an end-user account. Thus, if the end-user is not currently logged into their end-user account, processing branches to block 304, where a request may be made to the end-user to log into their end-user account. The request may include a message, a web-page, script, and the like, being sent to the end-user, including information sufficient to enable the end-user to log in. Processing then loops back to decision block 302. Otherwise, if the end-user is logged into their end-user account on the server, processing continues to block 306.

At block 306, a cookie is sent to the end-user's current computing device. The cookie may include a variety of information, including the end-user's account identifier, end-user identifier, and the like. Processing continues to block 308, where optionally, the end-user computing device may be further sent an encoded string, sometimes known as a crumb. The crumb may be provided to the end-user's computing device, for example, if a pre-determined web page is visited that is configured to enable initiation of an IM session on a mobile device. In another embodiment, however, the end-user may employ a toolbar selection, or the like, without visiting the pre-determined web page. In this embodiment, a crumb may not be provided to the end-user's computing device. However, the invention is not so limited. For example, a crumb may still be provided when the toolbar selection is chosen.

Process 300 continues next to decision block 310, where a determination is made whether the end-user has requested to be logged into an IM session on a mobile device. In one embodiment, the request is performed by the end-user clicking a toolbar button, menu selection, and the like, from a client application, such as a web browser, and the like. In any event, the request is made employing a mechanism other than an IM client application on the end-user's current computing device. The end-user's request may be sent using HTTP, or similar protocol that may further enable also sending of the cookie and optionally the crumb. If a request is detected, processing flows to block 312; otherwise, processing returns to a calling process to perform other actions.

At block 312, the cookie, and optionally the encoded string, is received. Processing continues to decision block 312, where a determination is made whether the request is authentic, based in part on the information within the cookie, and optionally the encoded string. In one embodiment, the information includes an end-user account identifier. The crumb may also be employed to authenticate that the request is derived from an authorized web page, script, form, applet, and other selection. If it is determined that the request is not authentic, processing returns to the calling process to perform other actions; otherwise, processing proceeds to block 316.

At block 316, the information associated with the cookie, such as an end-user account identifier, password, and the like, is employed to search a mapping of account identifiers to mobile device identifiers. If a mapping is identified, processing continues to block 318; otherwise, although not shown, an error message may be sent to the end-user, the process may exit, or any of a variety of other pre-determined actions may be performed.

At block 318, the end-user account identifier is employed to start an IM session on the mobile device associated with the mobile device identifier. In one embodiment, a notification is sent to a client application on the mobile device that is directed towards forcing the mobile device to sign into the IM session. In one embodiment, if the end-user is currently also logged into an IM session on the computing device, the end-user may be logged off of that IM session. Processing continues to block 320, where a message, such as an SMS message, may also be sent to the identified mobile device indicating that an IM session is active on the mobile device. The invention however, is not constrained to this action, and a variety of other actions may also be performed. For example, the message sent to the identified mobile device may itself trigger a login from a client application on the mobile device, such that a session is activated when the client explicitly signs in, or the like. Processing then returns to the calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing an Instant Messaging (IM) session over a network, comprising:
   receiving information indicating that a computing device is logged into an end-user account;
   providing a cookie to the computing device, wherein the cookie includes an end-user account identifier associated with the logged in end-user account on the computing device;
   receiving a request to sign into the IM session on a mobile device from the computing device independent of whether an IM session is active on the computer device, the request being initiated by a client application other than an IM client application on the computing device; and
   in response to receiving the request:
      authenticating the request, remotely from the mobile device and the computing device, based at least on the cookie and the end-user account identifier,
      using the end-user account identifier to locate a mobile device identifier for the mobile device through a mapping between the end-user account identifier and the mobile device identifier,
      employing the end-user account identifier and the mobile device identifier that is associated with the end-user account identifier to automatically log into the IM session on the mobile device associated with the mobile device identifier,
      automatically logging out of the IM session on the computing device and
      sending a message to the mobile device that the IM session is started.

2. The method of claim 1, wherein employing the end-user account identifier further comprises searching a mapping between a plurality of end-user account identifiers and mobile device identifiers to locate the mobile device identifier that is mapped to the provided end-user account identifier.

3. The method of claim 1, wherein receiving the request from the computing device further comprises receiving the cookie, and optionally a crumb, wherein the crumb indicates that the request is through a pre-determined web page.

4. The method of claim 1, wherein logging out of the IM session on the computing device is performed such that the IM session currently active on the computing device is transferred to the mobile device.

5. The method of claim 1, further comprising providing an encoded string to the computing device, wherein the encoded string indicates that a pre-determined web page is accessed by the computing device.

6. The method of claim 1, wherein the request is initiated employing at least one of a toolbar selection, a button, a menu, a script, an applet, a web page, or a form.

7. The method of claim 1, wherein authenticating the request further comprises authenticating that the request to sign into the IM session based further on authenticating a crumb that is associated with an authorized end-user selection.

8. A server for use in managing access to an Instant Messaging (IM) session, comprising:
   a transceiver for receiving and sending information to another computing device;
   a processor in communication with the transceiver; and
   a memory in communication with the processor and for use in storing data and machine instructions that cause the processor to perform a plurality of operations, including:
      providing information to a computing device, wherein the information includes an end-user account identifier associated with an end-user account for a user on the computing device;
      receiving a request from the computing device to sign into the IM session on a mobile device, wherein the request is from a client application other than an IM client application on the computing device and the request is received independent of whether an IM session is active on the computing device; and
      in response to receiving the request,
         authenticating the request remotely from the computing device and the mobile device based on at least the end-user account identifier;
         using the end-user account identifier to automatically locate a pre-determined mobile device identifier for the mobile device, wherein the mobile device is mapped to the end-user account identifier;
         employing the end-user account identifier of the user and the pre-determined mobile device identifier that is also associated with the end-user account identifier to automatically log into the IM session on the mobile device associated with mobile device identifier; and
         automatically logging out of the other IM session on the computing device.

9. The server of claim 8, wherein employing the end-user account identifier and the pre-determined mobile device identifier to log into the IM session on the mobile device further comprises sending a notification to the mobile device that enables a client application on the mobile device to log into the IM session.

10. The server of claim 8, wherein the plurality of operation further comprise sending a message to the mobile device that the IM session is started on the mobile device.

11. The server of claim 8, wherein providing the cookie further comprises:
   enabling the computing device to log into the end-user account; and
   sending the information to computing device in response to a successful log in to the end-user account.

12. The server of claim 8, wherein receiving the request from the computing device further comprises receiving a cookie, and optionally a crumb, wherein the crumb indicates that the request through a pre-determined web page.

13. The server of claim 8, wherein receiving the request from the computing device further comprises receiving a cookie, and a crumb, wherein the crumb indicates that the request through a pre-determined web page.

14. The server of claim 8, wherein automatically logging out of the other IM session on the computing device is performed such that the other IM session on the computing device is seamlessly transferred to the IM session on the mobile device such that the IM session and the other IM session appear as the same IM session.

15. The server of claim 8, further comprising providing an encoded string to the computing device, wherein the encoded string indicates the computing device made the request to sign into the IM session employing a pre-determined web page.

16. The server of claim 8, wherein the request is initiated employing at least one of a toolbar selection, a button, a menu, a script, an applet, a web page, or a form.

17. A computer readable storage medium that includes data and instructions, wherein the execution of the instructions on a computing device provides for managing access to an instant messaging (IM) session over a network by performing the actions of:
   providing, to a computing device, a cookie that includes an end-user account identifier associated with an end-user account;
   receiving a request to sign into the IM session on a mobile device from the computing device using other than an IM client on the computing device wherein the request is received independent of an IM session being active on the computing device; and
   in response to receiving the request:
      remotely authenticating the request using at least the end-user account identifier;
      enabling a search for a mobile device identifier using the end-user account identifier and a mapping between the mobile device identifier and the end-user account identifier,
      employing the end-user account identifier and the mobile device identifier to log into the IM session on the mobile device associated with the mobile device identifier,
      sending a message to the mobile device that the IM session is started, and
      automatically logging out of the IM session on the computing device.

18. The computer readable storage medium of claim 17, wherein searching for the mobile device identifier further comprises performing a search on a mapping between end-user account identifiers and mobile device identifiers, wherein the mapping is created during a pre-registration of a mobile device.

19. The computer readable storage medium of claim 17, wherein employing the end-user account identifier and a pre-determined mobile device identifier to log into the IM session on the mobile device further comprises sending a notification to the mobile device that enables a client application on the mobile device to log into the IM session.

20. The computer readable storage medium of claim 17, wherein receiving the request from the computing device further comprises receiving a cookie, and optionally a crumb, wherein the crumb indicates that the request is through a pre-determined web page.

* * * * *

UNITED STATES PATENT AND TRADEMARK OFFICE
CERTIFICATE OF CORRECTION

PATENT NO.      : 7,707,292 B2
APPLICATION NO. : 11/084769
DATED           : April 27, 2010
INVENTOR(S)     : Irvin Henderson et al.

It is certified that error appears in the above-identified patent and that said Letters Patent is hereby corrected as shown below:

In column 10, line 51, in claim 1, delete "device" and insert -- device if the same IM session is currently active on the computing device, --, therefor.

In column 11, line 48, in claim 8, delete "device." and insert -- device if another IM session is currently active on the computing device. --, therefor.

In column 11, line 55, in claim 10, delete "operation" and insert -- operations --, therefor.

In column 12, line 47, in claim 17, delete "device." and insert -- device if an IM session is currently active on the computing device. --, therefor.

Signed and Sealed this
Fifteenth Day of March, 2011

David J. Kappos
*Director of the United States Patent and Trademark Office*